Feb. 7, 1967  C. H. BECKER  3,302,914
WIRING FASTENERS
Filed Nov. 2, 1965
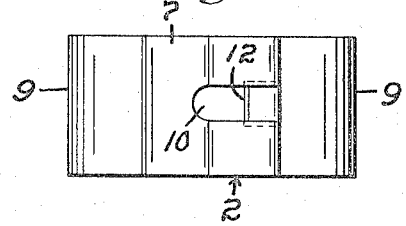
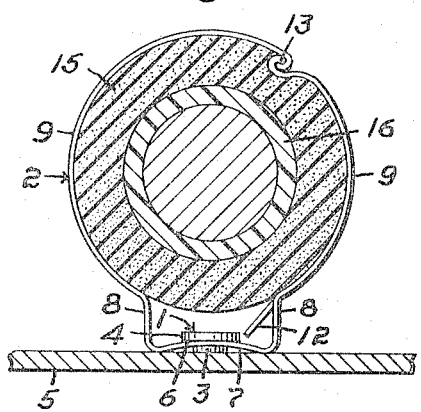
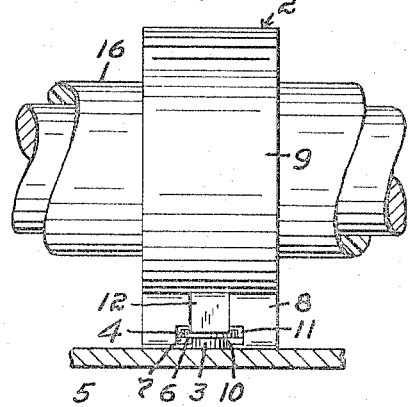
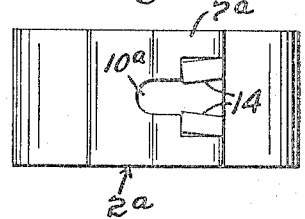
Inventor:
Charles H. Becker,
by James R. O'Connor
Atty.

United States Patent Office 3,302,914
Patented Feb. 7, 1967

3,302,914
WIRING FASTENERS
Charles H. Becker, Braintree, Mass., assignor to United-Carr Incorporated, Boston, Mass., a corporation of Delaware
Filed Nov. 2, 1965, Ser. No. 506,062
3 Claims. (Cl. 248—74)

This invention relates to an improved fastener combination for securing wires, tubes, cables and the like articles to a supporting sheet metal panel.

An object of the invention is to provide a simple, inexpensive, easily installed and highly efficient fastener combination for securing articles to a supporting sheet metal panel.

A further object of the invention is to provide a fastener combination wherein the male component of the combination is adapted to be affixed to the supporting panel without perforation thereof.

Additional objects and advantages of the novel fastener combination will become evident from a reading of the following detailed description in conjunction with a viewing of the accompanying drawing in which:

FIG. 1 is a bottom plan view of the clip which constitutes one of the components of the fastener combination;

FIG. 2 is a side view in section of an installation wherein the fastener combination is employed to secure an insulated cable to a sheet metal supporting panel;

FIG. 3 is an end view in full from the right of the installation depicted in FIG. 2; and FIG. 4 is a bottom plan view of an alternate form of the clip employed in the fastener combination.

The fastener combination comprises a small metal stud 1 and a resilient sheet metal clip 2.

The stud 1 includes a shank 3 and a generally circular head 4. The shank 3 is adapted to be fusedly secured by welding or some other means to the sheet metal supporting panel 5 at the end of the shank opposite the head 4 such that the head is spaced from and lies close to the surface of the panel 5 and the undersurface 6 of the head faces inwardly towards the surface of the panel.

The clip 2 includes a base structure having an upwardly bowed bottom portion 7, upstanding sides 8 at the ends of the bottom portion and a pair of flexible, interlocking bands 9 extending upwardly from the sides 8. The bottom portion 7 is provided with a laterally extending slot 10 opening adjacent one of the sides 8 and having a width slightly greater than the diameter of the stud shank 3. One of the sides 8 is provided with an opening 11 adjacent the open end of the slot 10 to receive the stud head 4 and the same side has a stud locking spring finger 12 struck therefrom and extending downwardly from said side to a free end termination adjacent the upwardly bowed bottom portion 7. The article-engaging bands 9 are each provided at their ends with interengageable hooks 13.

In the alternate form of the invention shown in FIG. 4 the clip 2a is provided with an additional pair of stud locking spring tabs 14 which are sheared from the bottom portion 7a and extend angularly therefrom into the slot 10a. This latter form of the invention may or may not include the stud locking spring finger 12.

To attach the clip 2 to the stud 1 the clip is slid onto the stud (which has been previously welded to the panel 5) so that the head 4 enters the opening 11 and the shank 3 enters the slot 10. As the head engages the locking finger 12, the finger flexes upwardly to allow the stud to pass and thereafter springs back to the position of FIG. 2 to prevent subsequent accidental disengagement of the clip from the stud.

In the alternate version of FIG. 4 the locking tabs 14 are, of course, spread outwardly as the stud shank moves to the closed end of the slot 10a and thereafter spring inwardly to engage the shank for further secure locking of the components.

In either disclosed version of the fastener combination the clip is tensioned against the panel by the engagement of the bowed bottom portion 7 and the undersurface 6 of the stud head 4.

Once the clip is secured to the stud the protective insulation 15 and the cable 16 are placed between the bands 9 and the locking hooks 13 are engaged. In the alternative the cables may be first secured to the clip 2 and the clip thereafter coupled to the stud.

While two forms of the invention have been disclosed herein for purposes of illustration it is anticipated that changes and modifications to the disclosure may be effected without departing from the scope of the invention which is best defined by the following claims.

I claim:

1. A fastener combination for securing wires, tubes, cables and the like articles to a supporting sheet metal panel comprising a stud having a head and a shank secured to a surface of the supporting panel at the end of the shank remote from the head without perforation of the panel such that the head of the stud is spaced from but lies in close proximity to the surface of the panel with the undersurface of the head facing inwardly toward the surface of the panel, and a clip engaging the stud, said clip including a base structure having a bottom portion and opposed upstanding side portions, said bottom portion being slightly bowed upwardly and having a slot formed therein extending from its midpoint to an open end adjacent one of said portions, said slot having a width slightly larger than the shank of said stud, at least one of said side portions having an opening formed therein adjacent said bottom portion and said slot, said opening being slightly wider than the head of said stud, said stud being seated in the slot such that its head overlies and is tensioned against the bowed portion to urge said clip tightly against the panel, locking means struck from at at least one of said bottom portion and said side portions, said locking means being located adjacent the open end of said slot, said locking means being spring acting so as to be displaceable away from said slot as the stud is passed into said slot from its open end and to spring back into a position to prevent accidental disengagement of said clip from the stud when the shank of the stud is fully seated in said slot, said locking means being disposed in said last mentioned position, and article engaging means extending upwardly from said base structure adapted to engage an article to be secured to the supporting panel by the fastener combination.

2. A fastener combination according to claim 1 wherein said stud-locking means is in the form of a spring finger sheared from one of said side portions of said base structure adjacent the opening therein and extending angularly from said side portions to a free end termination adjacent said bottom portion.

3. A fastener combination according to claim 1 wherein said stud-locking means is in the form of a pair of flexible tabs sheared from the bottom portion of said base structure adjacent said slot and extending angularly from said bottom portion into said slot.

References Cited by the Examiner

UNITED STATES PATENTS

| | | | |
|---|---|---|---|
| 991,192 | 5/1911 | Battenfeld | 248—74 |
| 2,404,110 | 7/1946 | Trafton | 248—74 |
| 2,936,981 | 5/1960 | Aversten | 248—74 |
| 3,027,128 | 3/1962 | Liberty | 248—74 |
| 3,120,938 | 2/1964 | Lucas | 248—68 |
| 3,185,418 | 5/1965 | Appleton | 248—72 |

FOREIGN PATENTS

| | | |
|---|---|---|
| 582,682 | 11/1946 | Great Britain. |
| 974,002 | 11/1964 | Great Britain. |

CLAUDE A. LE ROY, *Primary Examiner.*